United States Patent [19]

Sato

[11] Patent Number: 5,151,048

[45] Date of Patent: Sep. 29, 1992

[54] FAILSAFE ELECTRICAL CONNECTOR

[75] Inventor: Kensaku Sato, Tokyo, Japan

[73] Assignee: Hirose Electric Co., Ltd., Tokyo, Japan

[21] Appl. No.: 712,910

[22] Filed: Jun. 7, 1991

[30] Foreign Application Priority Data

Jul. 27, 1990 [JP] Japan ................................. 2-197725

[51] Int. Cl.5 ......................................... H01R 13/627
[52] U.S. Cl. ..................................... 439/357; 439/489
[58] Field of Search ............... 439/488, 489, 350, 345, 439/353, 357, 924, 135, 136, 137, 138, 139, 140, 680, 681

[56] References Cited

U.S. PATENT DOCUMENTS

| 4,542,946 | 9/1985 | Snow | 439/924 X |
| 4,867,699 | 9/1989 | Oda et al. | 439/924 X |
| 5,021,003 | 6/1991 | Ohtaka et al. | 439/357 |

Primary Examiner—Larry I. Schwartz
Assistant Examiner—Khiem Nguyen
Attorney, Agent, or Firm—Kanesaka & Takeuchi

[57] ABSTRACT

A failsafe electrical connector includes an electrical connector plug (10) including a main signal plug portion (14) with a pair of contact terminals (22) mounted therein and a check signal plug portion (15) with a contact terminal (23) mounted therein; a main signal socket (11) having a contact terminals (34, 35) for coming into contact with the contact terminals of the main signal plug portion when the main signal socket is fitted in the main signal plug portion; a check signal socket (12) having a contact terminal (43) for coming into contact with the contact terminal of the check signal plug portion when the check signal socket is fitted in the check signal plug portion; and a block device (50) provided in the connector plug for preventing insertion of the check signal socket into the check signal plug portion when a connection of the main signal socket into the main signal plug portion is incomplete.

1 Claim, 5 Drawing Sheets

FAILSAFE ELECTRICAL CONNECTOR

BACKGROUND OF THE INVENTION

1. Field of the Invention

The present invention relates to connectors for connecting, for example, the output of a controller of an air bag system to the control units of air bags for the driver and the front passenger.

2. Description of the Prior Art

FIG. 1 shows an air bag system mounted in an automobile which includes an air bag 2 for the driver which is mounted on a steering wheel 1; an air bag 3 for the front passenger; a controller 4 having a sensor therein; and a connector 5 for connecting the output of the controller 4 to the control units of the air bags 2 and 3. Upon collision, the sensor senses the impact and sets the controller 4 in operation to control the control units of the air bags 2 and 3 so that the air bags 2 and 3 instantly expand to protect the driver and the passenger from the impact.

The connector 5 includes a plug and a socket. The plug is connected to the socket to carry the main signal. When automobiles are shipped, it is necessary to connect the control units of air bags 2 and 3 to the controller 4 without fail. However, in the conventional connectors, the main signal is carried even if the plug is loosely connected to the socket. If an automobile is shipped with a loosely connected connector, the plug can get out of the socket with vibrations in use, and the air bags can fail to operate in the event of an accident.

SUMMARY OF THE INVENTION

Accordingly, it is an object of the invention to provide a failsafe electrical connector with which a loose connection is automatically prevented.

It is another object of the invention to provide a failsafe electrical connector capable of providing a feedback indicating a complete connection of the connector.

According to the invention there is provided a failsafe electrical connector comprising an electrical connector plug including a main signal plug portion with a contact terminal mounted therein and a check signal plug portion with a contact terminal mounted therein; a main signal socket having a contact terminal for coming into contact with the contact terminal of the main signal plug portion when the main signal socket is fitted in the main signal plug portion; a check signal socket having a contact terminal for coming into contact with the contact terminal of the check signal plug portion when the check signal socket is fitted in the check signal plug portion; and a block device provided in the connector plug for preventing insertion of the check signal socket into the check signal plug portion when a connection of the main signal socket into the main signal plug portion is incomplete.

When the connection of the main signal socket to the main signal plug portion is completed, the block device permits the check signal socket to be fitted into the check signal plug portion so that the contact terminal of the check signal socket comes into contact with that of the check signal plug portion, indicating that the complete connection between the main signal socket and the main signal plug portion is established.

When the connection between the main signal socket and the mains signal plug portion is incomplete, the block device prevent the check signal socket from being inserted into the check signal plug portion, indicating that the connection is incomplete. In other words, unless the main signal socket is completely fitted into the main signal plug portion, it is impossible to fit the check signal socket into the check signal plug portion, thus providing automatic prevention of incomplete connections. When the main signal socket is fitted completely in the main signal plug portion so that the contact terminal of the check signal socket comes into contact with that of the check signal plug portion, indicating that the connection is complete.

The above and other objects, features, and advantages of the invention will be more apparent from the following description when taken in conjunction with the accompanying drawings.

DESCRIPTION OF THE PREFERRED EMBODIMENT

Figure 2:
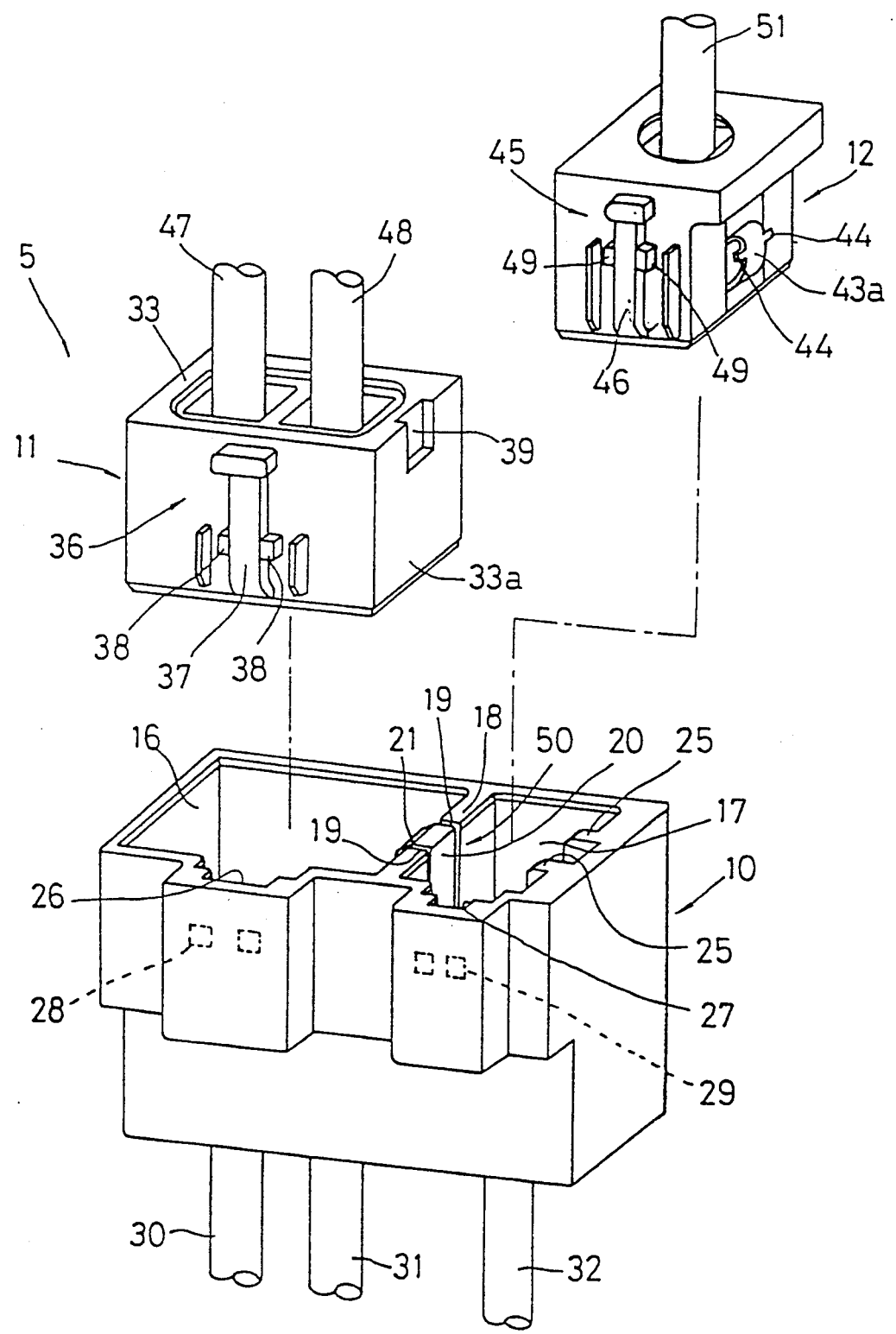
FIG. 2 is an exploded perspective view of the connector consisting of a plug and main and check signal sockets.

In FIG. 2, the connector 5 includes a plug 10; a main signal socket 11; and a check signal socket 12.

Figure 3:
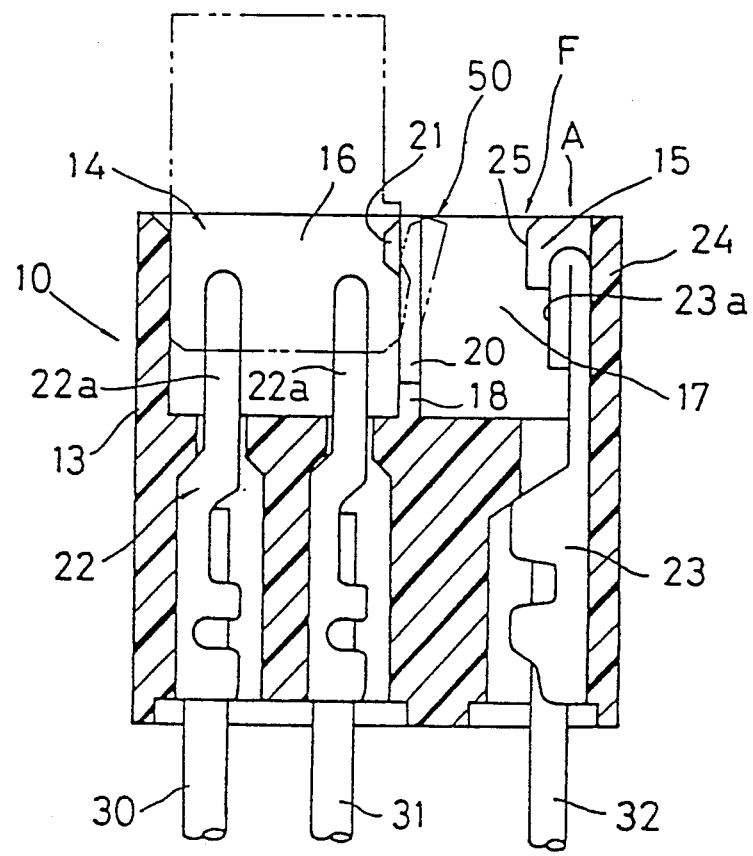
FIG. 3 is a longitudinal section of the plug.

In FIG. 3, the plug 10 has a case 13 consisting of a two pole plug portion 14 for the main signals and a one pole plug portion 15 for the check signal. The main and check signal plug portions 14 and 15 have plug cavities 16 and 17, respectively, which is separated by a partition wall 18. The partition wall 18 has a pair of slits 19 extending downwardly from the top to the bottom thereof to form a tongue member 20. The tongue member 20 has a projection 21 extending into the plug cavity 16 from its top portion, forming a block arm 50.

Figure 4:
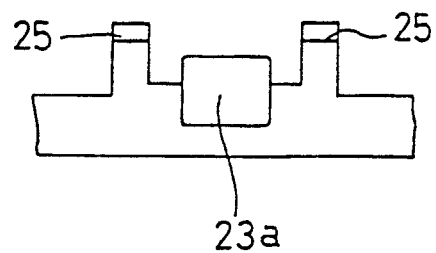
FIG. 4 is a front view of part of the plug viewed from an arrow A of FIG. 3.
Figure 8:
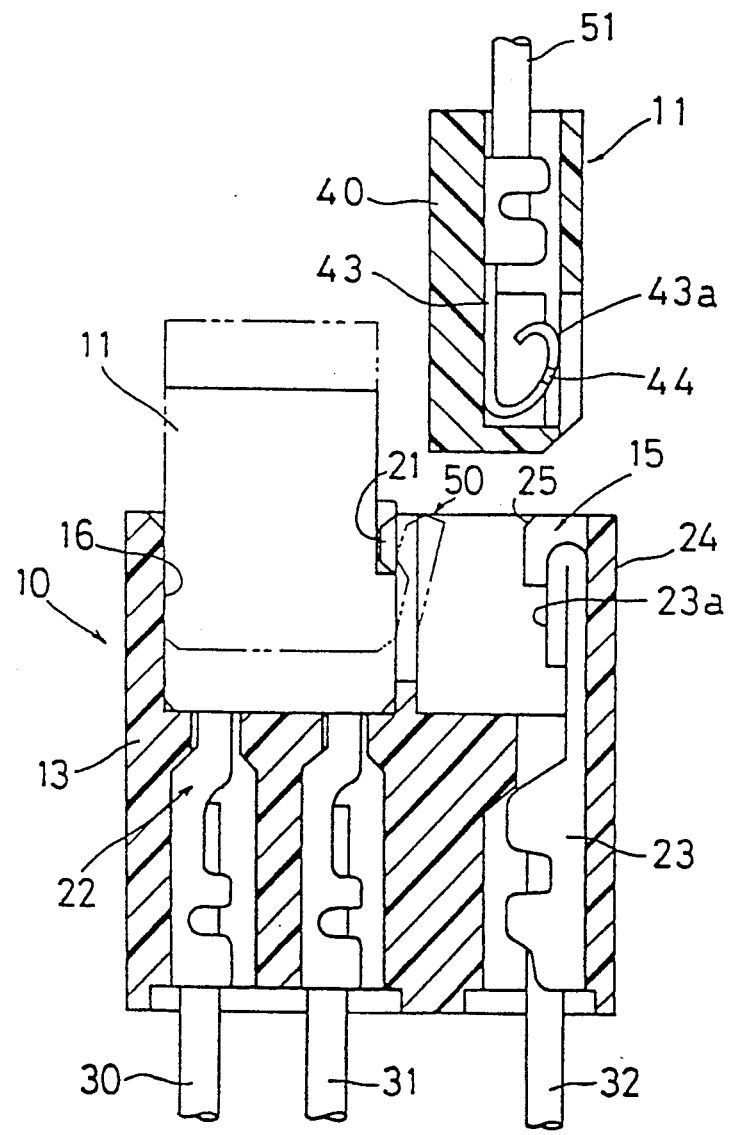
FIG. 8 is a longitudinal section of the plug into which the main signal socket is being connected as indicated by the broken line and completely connected as indicated by the solid line.
Figure 9:
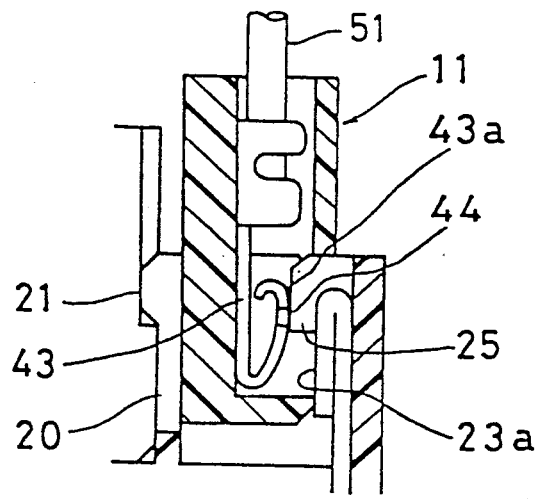
FIG. 9 is a longitudinal section of the plug into which the check signal socket is being connected.
Figure 10:
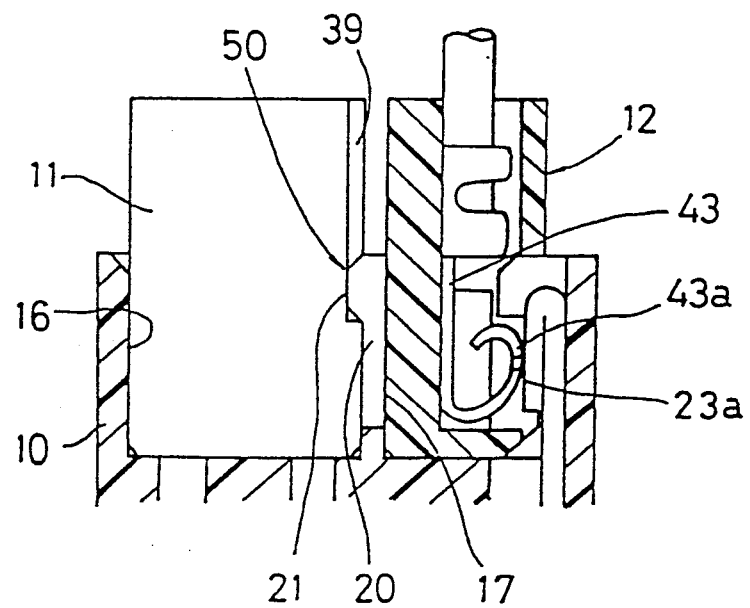
FIG. 10 is a longitudinal section of the plug into which the check signal socket is connected completely.

A pair of contact terminals 22 are mounted in the main signal plug portion 14 such that the contact portions 22a project into the plug cavity 16. A contact terminal 23 is mounted in the check signal plug portion 15 such that the contact portion 23a rests on a side wall 24 of the plug cavity 17. As shown in FIG. 4, a pair of projected rims 25 are formed on opposite sides of the top portion of the contact portion 23a. As best shown in FIG. 2, a pair of lock receiving recesses 26 and 27 are formed on sides of the plug cavities 16 and 17 and have locking portions 28 and 29, respectively.

A pair of main signal lines 30 and 31 and a check signal line 32 from the controller 4 are connected to the contact terminals 22 of the main signal plug portion 15 and the contact terminal 23 of the check signal plug portion 16, and the plug is incorporated in the air bag system.

Figure 1:
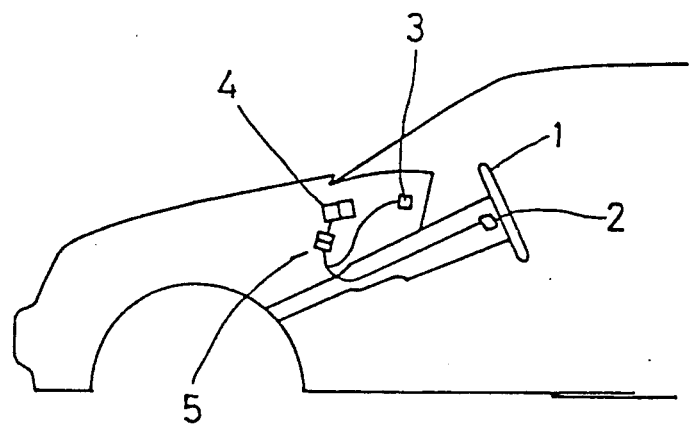
FIG. 1 is a side elevational view of an air bag system using a failsafe electrical connector according to an embodiment of the invention.
Figure 5:
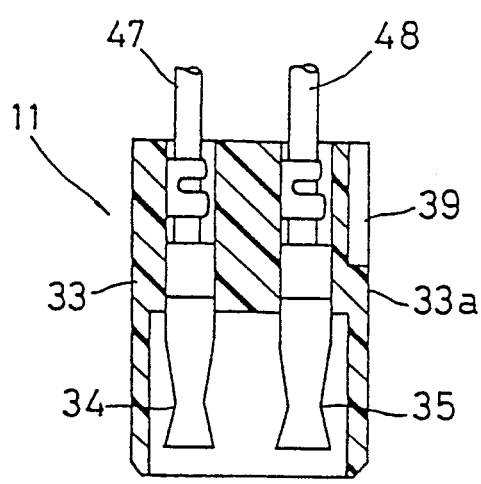
FIG. 5 is a longitudinal section of the main signal socket.

In FIG. 5, the main signal socket 11 has a case 33 in which a pair of contact terminals 34 and 35 are mounted. As best shown in FIG. 2, a lock device 36 is provided on an outside of the case 33. The lock device 36 has a cantilever lock arm 37 extending upwardly from the front end of a side of the case 33. A pair of engaging projections 38 are provided on opposite sides of the lock arm 37. An engaging recess 39 is formed on the rear portion a side wall 33a of the case 33. A pair of signal lines 47 and 48 from the driver's and passenger's side air bags 2 and 3 are connected to the contact terminals 34 and 35, and the socket is incorporated in the air bag system.

Figure 6:
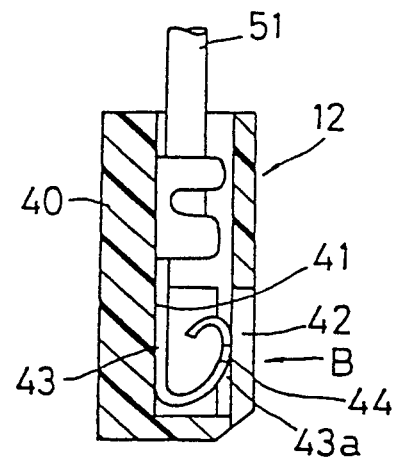
FIG. 6 is a longitudinal section of the check signal socket.
Figure 7:
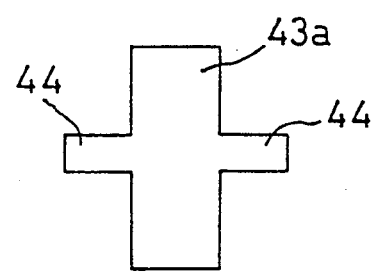
FIG. 7 is a side elevational view of a contact terminal of the check signal plug viewed from an arrow B of FIG. 6.

In FIG. 6, the check signal socket 12 has a case 40 having a terminal cavity 41 with an opening 42 on its side. A contact terminal 43 having a C-shaped cross section and a pair of lateral arms 44 is mounted in the terminal cavity 41 such that the contact portion 43a exposed through the opening 42. As best shown in FIG. 2, a lock device 45 is provided on an outside of the case 40. The lock device 45 has a cantilevered lock arm 46 extending rearwardly from the front end of a side of the case 40. A pair of engaging projections 49 are provided on opposite sides of the lock arm 46. A check signal line 51 is connected to the contact terminal 41, and the socket is incorporated in the air bag system.

In operation, upon shipping, it is necessary to connect the driver's and passenger's side air bags 2 and 3 to the controller 4 without failure. The main signal socket 11 is fitted into the plug cavity 16 of the main signal plug portion 14 so that the contact terminals 34 are connected to the contact terminals 22. As shown by the broken line in FIG. 3, the front portion 33a of the main signal socket 11 contacts the projection 21 of the tongue member 20 to flex the tongue member 20 toward the plug cavity 17 of the check signal plug portion 15. When the contact terminal 34 is connected to the contact terminal 22 of the main signal plug portion 14, the projection 21 of the tongue member 29 snaps in the engaging recess 39 of the side wall 33a so that the block arm 50 returns to the original position as shown by the solid line in FIG. 3.

When the cantilevered locking arm 37 of the main signal socket 11 is inserted into the lock device receiving recess 26, the engaging projection 38 of the locking arm 37 engages the locking portion 28 of the receiving recess 26, thereby locking the socket 11 to the plug 10.

When the main signal socket 11 is fitted into the plug cavity 16 of the main signal plug portion 14, the block arm 50 does not project into the plug cavity 17 of the check signal plug portion 15 so that it is possible to fit the check signal socket 12 into the plug cavity 17 of the check signal plug portion 12. As the check signal socket 12 is fitted into the plug cavity 17, the lateral arms 44 of the contact terminal 41 slide along the projected rims 25 of the check signal plug portion 15 so that the contact portion 43a of the contact terminal 43 flexes inwardly. As the check signal socket 12 is further inserted into the plug cavity 17, the lateral arms 44 pass the projected rims 25 while the contact portion 43a of the contact terminal 43 comes into contact to the contact terminal 23 of the check signal plug portion 15. Consequently, it is possible to conduct the check signal for confirming the complete connection of the main signal socket 11 to the plug portion 15. At the same time, the cantilevered lock arm 46 of the check signal socket 12 is inserted into the lock device receiving recess 27 so that the engaging projections 49 engage the lock portion 29 of the receiving recess 27, thereby locking the check signal socket 12 to the check signal plug portion 15.

If the connection of the main signal socket 11 to the main signal plug portion 14 is incomplete, the side wall 33a of the main signal socket 11 abuts on the projection 21 of the block arm 50 and flexes the block arm 50 toward the plug cavity 17 of the check signal plug portion 15 as shown by the broken line in FIG. 3 so that it is impossible to fit the check signal socket 12 into the plug cavity 17 of the check signal plug portion 15. Thus, it is indicated that the connection of the main signal socket 11 to the main signal plug portion 14 is incomplete.

As has been described above, unless the main signal socket is connected to the main signal plug portion, it is impossible to connect the check signal socket to the check signal plug portion. In other words, it is possible to prevent the incomplete connection of the connector in advance. When the main and check signal sockets are connected to the main and check plug portions, respectively, the contact terminal of the check signal socket comes into contact with the contact terminal of the check signal plug portion to conduct the check signal so that the complete connection is confirmed before the automobile is shipped.

I claim:

1. A failsafe electrical connector comprising:
   an electrical connector plug including a main signal plug portion with a contact terminal mounted therein, a check signal plug portion with a contact terminal mounted therein, and a partition wall provided between said main signal plug portion and said check signal plug portion;
   a main signal socket having a side wall with an engaging recess and a contact terminal for coming into contact with said contact terminal of said main signal plug portion when said main signal socket is fitted in said main signal plug portion;
   a check signal socket having a contact terminal for coming into contact with said contact terminal of said check signal plug portion when said check signal socket is fitted in said check signal plug portion; and
   block means provided on said partition wall in the form of a flexible block arm and having a projection toward said main signal plug portion so that when a connection of said main signal socket into said main signal plug portion is complete, said recess engages said projection of said flexible block arm to permit insertion of said check signal socket into said check signal plug portion while if the connection is incomplete, said side wall flexes said block arm toward said check signal plug portion to thereby prevent insertion of said check signal socket into said check signal plug portion.

* * * * *